(12) United States Patent
Lu et al.

(10) Patent No.: US 11,637,967 B2
(45) Date of Patent: Apr. 25, 2023

(54) INFORMATION PROCESSING APPARATUS, INFORMATION PROCESSING METHOD, AND CALIBRATION APPARATUS

(71) Applicant: SONY CORPORATION, Tokyo (JP)

(72) Inventors: Ying Lu, Kanagawa (JP); Yasutaka Hirasawa, Tokyo (JP); Yuhi Kondo, Tokyo (JP); Tuo Zhuang, Tokyo (JP); Legong Sun, Tokyo (JP)

(73) Assignee: SONY CORPORATION, Tokyo (JP)

( * ) Notice: Subject to any disclaimer, the term of this patent is extended or adjusted under 35 U.S.C. 154(b) by 95 days.

(21) Appl. No.: 17/044,533

(22) PCT Filed: Jan. 15, 2019

(86) PCT No.: PCT/JP2019/000860
§ 371 (c)(1),
(2) Date: Oct. 1, 2020

(87) PCT Pub. No.: WO2019/198287
PCT Pub. Date: Oct. 17, 2019

(65) Prior Publication Data
US 2021/0152748 A1     May 20, 2021

(30) Foreign Application Priority Data
Apr. 9, 2018 (JP) .............................. JP2018-074597

(51) Int. Cl.
*H04N 5/243* (2006.01)
*G06T 7/80* (2017.01)
(Continued)

(52) U.S. Cl.
CPC ................ *H04N 5/243* (2013.01); *G01J 4/04* (2013.01); *G01N 21/21* (2013.01); *G06T 7/80* (2017.01);
(Continued)

(58) Field of Classification Search
CPC .... H04N 5/243; H04N 5/2256; H04N 5/2351; H04N 17/002; H04N 5/332; H04N 5/238;
(Continued)

(56) References Cited

U.S. PATENT DOCUMENTS

| 2006/0170932 A1* | 8/2006 | Hayashi | G01J 9/02 356/495 |
| 2009/0201480 A1* | 8/2009 | Arai | G03F 7/706 355/67 |
| 2018/0058934 A1 | 3/2018 | Shen et al. | |

FOREIGN PATENT DOCUMENTS

| EP | 1688720 A2 | 8/2006 |
| JP | 2006-214856 A | 8/2006 |

(Continued)

OTHER PUBLICATIONS

Wolff, et al., "Constraining Object Features Using a Polarization Reflectance Model", Transactions on Pattern Analysis and Machine Intelligence, IEEE, vol. 13, No. 7, Jul. 1991, pp. 635-657.
(Continued)

*Primary Examiner* — Mekonnen D Dagnew
(74) *Attorney, Agent, or Firm* — Chip Law Group

(57) ABSTRACT

Provided is a polarization imaging unit that acquires a polarization image using a lens. In a parameter storage unit of an information processing unit, parameters related to a change in polarization state due to the lens which are estimated in advance from polarization state information acquired by imaging a light source in a predetermined polarization state using the lens and polarization state information indicating the polarization state of the light source, for example, change parameters indicating the change in polarization state due to the lens or correction parameters for correcting the change in polarization state due to the lens are stored. A polarization state correction unit of the information processing unit corrects the change in polarization state due
(Continued)

to the lens, using the parameters stored in advance in the parameter storage unit.

11 Claims, 11 Drawing Sheets

(51) Int. Cl.
| | |
|---|---|
| *G01J 4/04* | (2006.01) |
| *G01N 21/21* | (2006.01) |
| *H04N 5/225* | (2006.01) |
| *H04N 5/235* | (2006.01) |
| *H04N 17/00* | (2006.01) |

(52) U.S. Cl.
CPC ......... *H04N 5/2256* (2013.01); *H04N 5/2351* (2013.01); *H04N 17/002* (2013.01); *G06T 2207/10152* (2013.01)

(58) Field of Classification Search
CPC ... G01J 4/04; G01N 21/21; G06T 7/80; G06T 2207/10152
See application file for complete search history.

(56) References Cited

FOREIGN PATENT DOCUMENTS

| | | |
|---|---|---|
| JP | 2017-523438 A | 8/2017 |
| JP | 2018-066965 A | 4/2018 |
| JP | 2018-067896 A | 4/2018 |
| WO | 2015/198061 A1 | 12/2015 |
| WO | 2016/136085 A1 | 9/2016 |

OTHER PUBLICATIONS

Atkinson, et al., "Recovery of Surface Orientation from Diffuse Polarization", Transactions on Image Processing, IEEE, vol. 15, No. 6, Jun. 2006, pp. 1653-1664.

Yuji Ikeda, "Design of Polarization Measurement System using Code V—Design and Analysis method Considering data reduction", Genesia Corporation, Oct. 23, 2003, pp. 7-10.

International Search Report and Written Opinion of PCT Application No. PCT/JP2019/000860, dated Apr. 16, 2019, 11 pages of ISRWO.

Atkinson, et al., "Recovery of surface orientation from diffuse polarization", IEEE Transactions of Image Processing, vol. 15, No. 6, Jun. 2006, pp. 1653-1664.

Wolff, et al., "Constraining Object Features Using a Polarization Reflectance Model", IEEE Transaction on pattern analysis and machine intelligence, vol. 13, No. 7, Jul. 1991, pp. 635-657.

\* cited by examiner

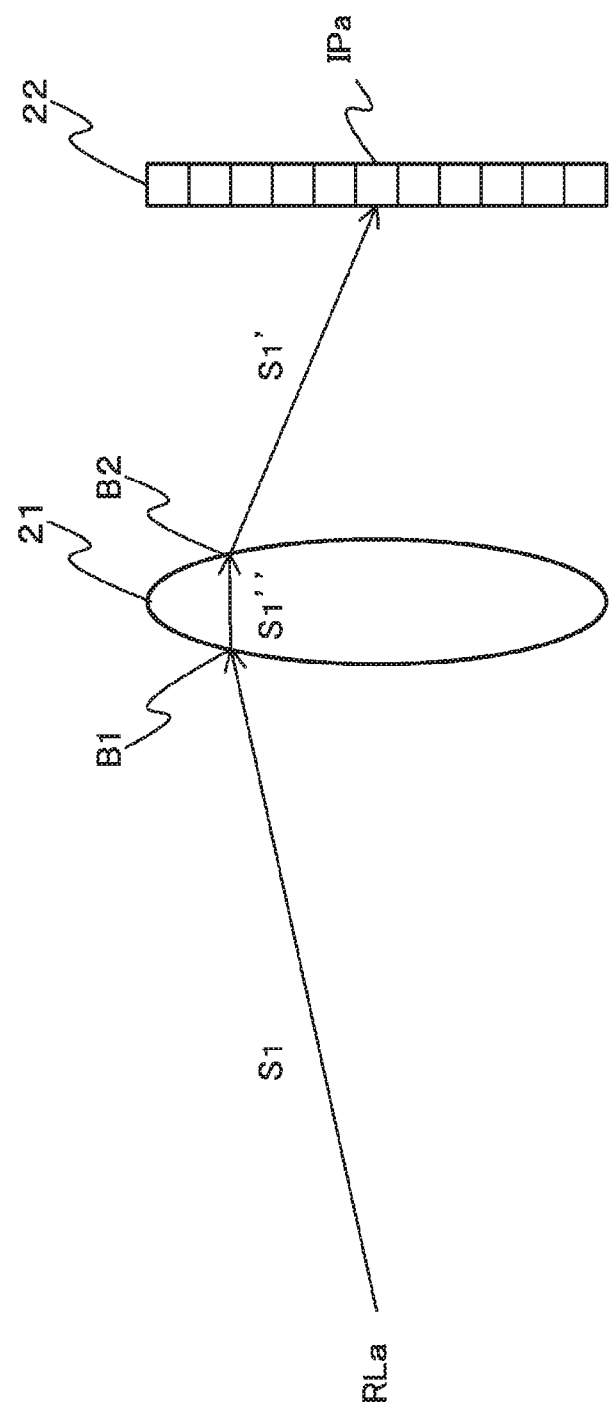

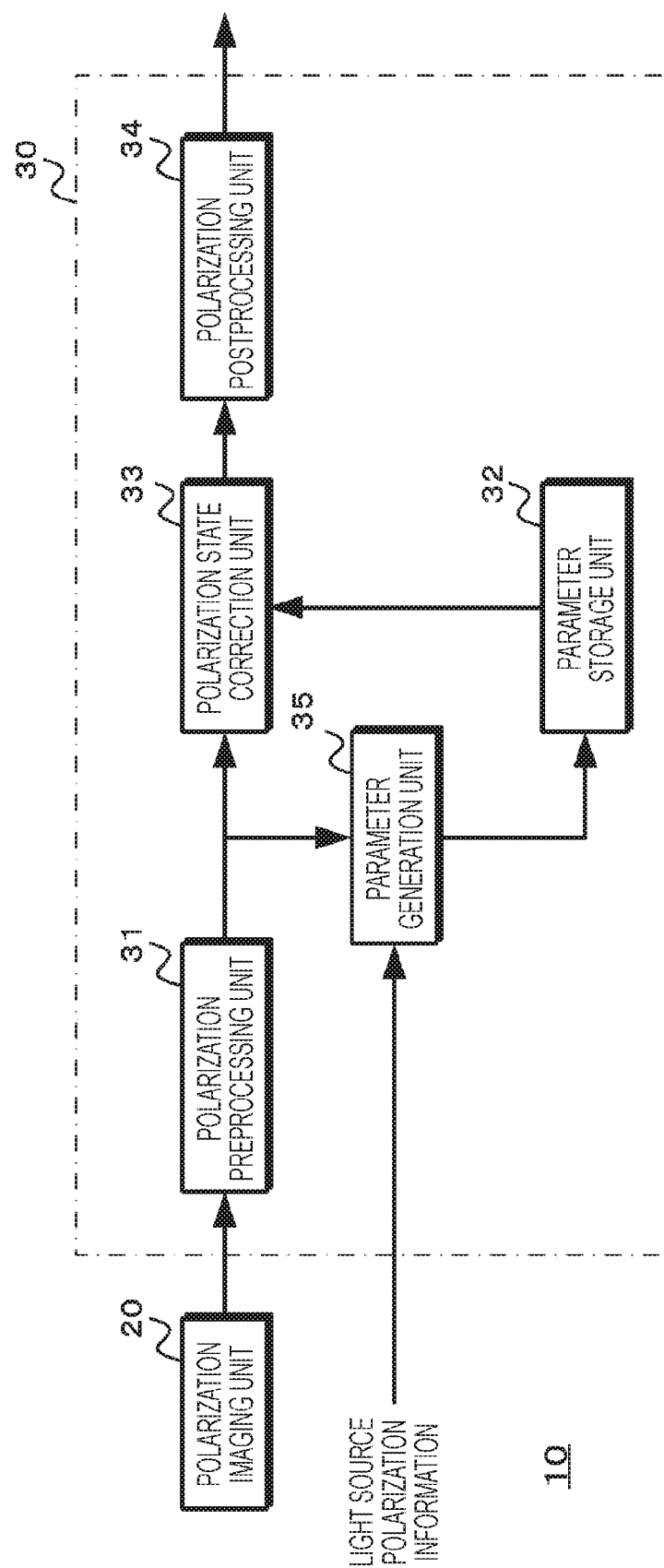

INFORMATION PROCESSING APPARATUS, INFORMATION PROCESSING METHOD, AND CALIBRATION APPARATUS

CROSS REFERENCE TO RELATED APPLICATIONS

This application is a U.S. National Phase of International Patent Application No. PCT/JP2019/000860 filed on Jan. 15, 2019, which claims priority benefit of Japanese Patent Application No. JP 2018-074597 filed in the Japan Patent Office on Apr. 9, 2018. Each of the above-referenced applications is hereby incorporated herein by reference in its entirety.

TECHNICAL FIELD

This technology relates to an information processing apparatus, an information processing method, a program, and a calibration apparatus, and corrects a change in polarization state due to a lens.

BACKGROUND ART

Generation of normal information of subjects and separation of reflection components and the like from polarization images with a plurality of polarization directions have been performed. For example, in Non-Patent Document 1 and Non-Patent Document 2, normal information is generated by applying polarization images with a plurality of polarization directions to a model formula. Furthermore, in Patent Document 1, separation, extraction, and the like of reflection components are performed, and normal information is generated accurately using a polarization image of the reflection components.

CITATION LIST

Patent Document

Patent Document 1: WO 2016/136085 A

Non-Patent Documents

Non-Patent Document 1: Lawrence B. Wolff and Terrance E. Boult: "Constraining Object Features Using a Polarization Reflectance Model", IEEE Transaction on pattern analysis and machine intelligence, Vol. 13, No. 7, July 1991
Non-Patent Document 2: Gary A. Atkinson and Edwin R. Hancock: "Recovery of surface orientation from diffuse polarization", IEEE Transactions of Image Processing, Vol. 15, Issue. 6, pp. 1653-1664, 2006

SUMMARY OF THE INVENTION

Problems to be Solved by the Invention

By the way, it is known that the polarization state of light changes due to reflection or refraction. For example, in a case where light rays pass through a lens of a polarization imaging unit and enter an image sensor, the light rays are refracted when entering the lens from the air and when exiting from the lens into the air, so that light incident on the image sensor is light changed in polarization state due to the lens. Consequently, a polarization state indicated by a polarization image may differ from the polarization state of light from a subject, preventing accurate generation of normal information and separation of reflection components and the like.

Therefore, it is an object of this technology to provide an information processing apparatus, an information processing method, a program, and a calibration apparatus that can correct a change in polarization state due to a lens.

Solutions to Problems

A first aspect of this technology is in an information processing apparatus including
a polarization state correction unit that corrects a change in polarization state due to a lens produced in polarization state information based on a polarization image acquired by imaging using the lens, using parameters related to the change in polarization state due to the lens estimated in advance from polarization state information acquired by imaging a light source in a predetermined polarization state using the lens and polarization state information indicating the polarization state of the light source.

In this technology, change parameters representing a change in polarization state due to a lens used when a polarization image containing at least three or more polarization components is acquired or correction parameters for correcting the change in polarization state are generated in advance on a pixel-by-pixel basis, and the change in polarization state due to the lens produced in polarization state information based on the polarization image acquired by imaging using the lens is corrected using the parameters. The polarization state information includes, for example, a Stokes vector obtained from pixel values with different polarization directions, and the parameters are component values of a matrix representing an amount of change of the polarization state information. Furthermore, the polarization state information may include, for example, pixel values with different polarization directions, and the parameters may be component values of a matrix calculated using a matrix representing a relationship between the pixel values with the different polarization directions, a matrix representing a relationship between the pixel values with the different polarization directions and a Stokes vector obtained from the pixel values with the different polarization directions, and a matrix representing an amount of change of the polarization state information when the polarization state information indicates the Stokes vector. Moreover, the polarization state information may include a degree of polarization, an azimuth angle, and an average intensity, and the parameters may be component values of a matrix representing an amount of change of the polarization state information.

Furthermore, a polarization preprocessing unit may be further included which performs defect correction or sensitivity correction of the polarization image acquired by a polarization imaging unit so that the polarization state information can be generated from the corrected polarization image.

A second aspect of this technology is in an information processing method including:
acquiring, by a polarization state correction unit, polarization state information based on a polarization image acquired by imaging using a lens; and
correcting, by the polarization state correction unit, a change in polarization state due to the lens produced in the polarization state information based on the polarization image, using parameters related to the change in polarization state due to the lens estimated in advance from polarization state information acquired by imaging a light source in a predetermined polarization state using the lens and polarization state information indicating the polarization state of the light source.

A third aspect of this technology is in a program that causes a computer to execute processing of polarization state information, the program causing the computer to execute:

a step of acquiring, by a polarization state correction unit, polarization state information based on a polarization image acquired by imaging using a lens; and a step of correcting a change in polarization state due to the lens produced in the polarization state information based on the polarization image, using parameters related to the change in polarization state due to the lens estimated in advance from polarization state information acquired by imaging a light source in a predetermined polarization state using the lens and polarization state information indicating the polarization state of the light source.

Note that the program of the present technology is a program that can be provided, for example, to a general-purpose computer capable of executing various program codes, through a storage medium or a communication medium that provides it in a computer-readable format, for example, a storage medium such as an optical disk, a magnetic disk, or a semiconductor memory, or a communication medium such as a network. By providing such a program in a computer-readable format, processing according to the program is implemented on the computer.

A fourth aspect of this technology is in a calibration apparatus including:

a light source that emits light in a predetermined polarization state; and a parameter generation unit that generates parameters related to a change in polarization state due to a lens from polarization state information based on a polarization image indicating a light-emitting surface of the light source acquired by imaging using the lens, and polarization state information indicating the polarization state of the light emitted from the light source.

In this technology, the polarization state of the light emitted from the light source can be changed, for example, and the parameter generation unit generates, from the polarization state information based on the polarization image containing a plurality of polarization components, and the polarization state information indicating the polarization state of the light emitted from the light source, parameters related to a change in polarization state due to the lens for each polarization component. Further, the light source may set the polarization direction of the emitted light to a direction other than X-Y linear polarization directions, for example, a 45-degree linear polarization direction having an angular difference of 45° with respect to the X-Y linear polarization directions. Furthermore, defect correction or sensitivity correction of the polarization image acquired by imaging using the lens may be performed to generate the polarization state information on the basis of the corrected polarization image.

Effects of the Invention

According to this technology, even if polarization state information based on a polarization image acquired by imaging using a lens has a change in polarization state due to the lens, the change in polarization state can be corrected by using parameters related to the change in polarization state due to the lens which are estimated in advance from polarization state information acquired by imaging a light source in a predetermined polarization state using the lens and polarization state information indicating the polarization state of the light source. Note that effects described in the present description are merely illustrative and non-limiting, and additional effects may be included.

BRIEF DESCRIPTION OF DRAWINGS

FIG. 2 is a diagram for explaining a change in polarization state in a case where a subject is imaged through an imaging lens.

FIG. 11 is a diagram illustrating the configuration of the information processing unit having a calibration function.

MODE FOR CARRYING OUT THE INVENTION

Figure 1A:
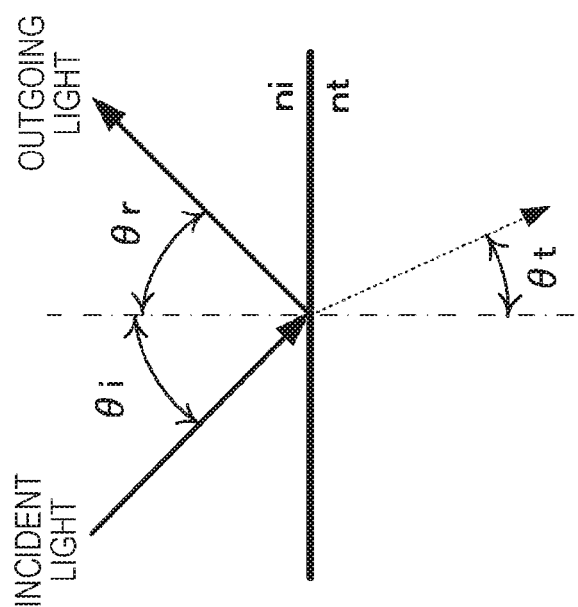
FIGS. 1A and 1B are diagrams for explaining a change in polarization state at and around an interface between two media of different refractive indices.

Hereinafter, an embodiment for implementing the present technology will be described. Note that the description is made in the following order.

1. About change in polarization state due to lens

2. Configuration and operation of information processing apparatus

3. Configuration and operation of calibration apparatus

4. Application examples

1. About Change in Polarization State Due to Lens

When a subject is imaged through a lens and polarizers with the polarization directions of the polarizers, for example, linear polarizers set to 0°, 45°, 90°, and 135°, the polarization state of one pixel can be represented by a pixel value $I_0$ when the polarization direction is 0°, a pixel value $I_{45}$ when the polarization direction is 45°, a pixel value $I_{90}$ when the polarization direction is 90°, and a pixel value $I_{135}$ when the polarization direction is 135°. Furthermore, by using a circular polarizer as a polarizer, it can be represented by a pixel value $I_r$ at the time of right-hand polarization or a pixel value $I_l$ at the time of left-hand polarization. Moreover, the polarization state can also be represented by a four-dimensional vector $[s_0\ s_1\ s_2\ s_3]^T$ called a Stokes vector. Note that the relationship between the Stokes vector and the pixel values is given by equation (1).

[Math. 1]

$$\begin{bmatrix} s_0 \\ s_1 \\ s_2 \\ s_3 \end{bmatrix} = \begin{bmatrix} \dfrac{I_0 + I_{45} + I_{90} + I_{135}}{2} \\ I_0 - I_{90} \\ I_{45} - I_{135} \\ I_r - I_l \end{bmatrix} \quad (1)$$

In the Stokes vector, a component $s_0$ represents an unpolarized intensity or an average intensity. Furthermore, a component $s_1$ represents the difference in intensity between 0° and 90° polarization directions, a component $s_2$ represents the difference in intensity between 45° and 135° polarization directions, and a component $s_3$ represents the degree of polarization of circularly polarized light. For example, the polarization state of unpolarized light is represented as the Stokes vector $[(I_0+I_{45}+I_{90}+I_{135})/2 \ 0 \ 0 \ 0]^T$. Furthermore, the polarization state of light with a polarization direction of 0° is represented as the Stokes vector $[I_0 \ I_0 \ 0 \ 0]^T$, the polarization state of light with a polarization direction of 45° as the Stokes vector $[I_{45} \ 0 \ I_{45} \ 0]^T$, and right-hand circularly polarized light as the Stokes vector $[I_r \ 0 \ 0 \ I_r]^T$.

Moreover, from the polarization states represented by the Stokes vector, for example, the degree of polarization p can be calculated on the basis of equation (2) and the azimuth angle φ on the basis of equation (3).

[Math. 2]

$$p = \frac{\sqrt{s_1^2 + s_2^2}}{0.5 s_0} \quad (2)$$

$$\phi = \arctan\left(\frac{s_1}{s_2}\right) \quad (3)$$

Next, a change in polarization state will be described using the Stokes vector. The relationship between the Stokes vector $[s_0 \ s_1 \ s_2 \ s_3]^T$ before a change in polarization state and the Stokes vector $[s_0' \ s_1' \ s_2' \ s_3']^T$ after the change becomes the relationship in equation (4) when a Mueller matrix is used.

[Math. 3]

$$\begin{bmatrix} s_0' \\ s_1' \\ s_2' \\ s_3' \end{bmatrix} = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} \cdot \begin{bmatrix} s_0 \\ s_1 \\ s_2 \\ s_3 \end{bmatrix} \quad (4)$$

Figure 1B:
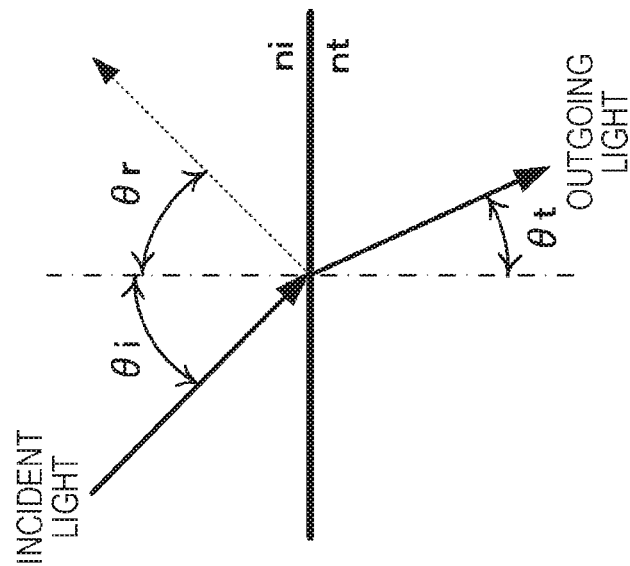

FIGS. 1A and 1B are diagrams for explaining a change in polarization state at and around an interface between two media of different refractive indices. Part of light incident on the interface is specularly reflected, and the other part enters the other medium and is refracted. Furthermore, the polarization state of light changes each time specular reflection or refraction occurs.

Here, the relationship between the polarization state Si of the incident light and the polarization state Sr of the specularly reflected light is given by equation (5), and the relationship between the polarization state Si of the incident light and the polarization state St of the refracted light is given by equation (6), where θi is the incidence angle, θr is the specular reflection angle, and θt is the refraction angle. Note that "$\alpha_+ = \theta i + \theta t$" and "$\alpha_- = \theta i - \theta t$" in equations (5) and (6). Furthermore, a matrix $M_r$ is a Mueller matrix of the specular reflection, and a matrix $M_t$ is a Mueller matrix of the refraction.

[Math. 4]

$$S_r = M_r \cdot S_i = \frac{1}{2}\left(\frac{\tan\alpha_-}{\sin\alpha_+}\right)^2 \begin{bmatrix} (\cos^2\alpha_- + \cos^2\alpha_+) & (\cos^2\alpha_- - \cos^2\alpha_+) & 0 & 0 \\ (\cos^2\alpha_- - \cos^2\alpha_+) & (\cos^2\alpha_- + \cos^2\alpha_+) & 0 & 0 \\ 0 & 0 & -(2\cos\alpha_-\cos\alpha_+) & 0 \\ 0 & 0 & 0 & -(2\cos\alpha_-\cos\alpha_+) \end{bmatrix} \cdot S_i \quad (5)$$

$$S_t = M_t \cdot S_i = \frac{1}{2}\frac{\sin 2\theta_i \sin 2\theta_t}{(\sin\alpha_+ \cos\alpha_-)^2} \begin{bmatrix} (\cos^2\alpha_- + 1) & (\cos^2\alpha_- - 1) & 0 & 0 \\ (\cos^2\alpha_- - 1) & (\cos^2\alpha_- + 1) & 0 & 0 \\ 0 & 0 & -(2\cos\alpha_-) & 0 \\ 0 & 0 & 0 & -(2\cos\alpha_-) \end{bmatrix} \cdot S_i \quad (6)$$

As is clear from equations (5) and (6), the Mueller matrix $M_r$ of the specular reflection and the Mueller matrix $M_t$ of the refraction both relate only to the incidence angle and the refraction angle of light. Furthermore, since the refraction angle relates to the incidence angle and the refractive indices of the two media at the interface, the Mueller matrix of the specular reflection and the Mueller matrix of the refraction relate to the incidence angle and the refractive indices of the two media at the interface. Note that equation (7) expresses the relationship between the refraction angle θt and the incidence angle θi, and the refractive indices $\eta_i$ and $\eta_t$ of the two media at the interface.

[Math. 5]

$$\frac{\sin(\theta_i)}{\sin(\theta_t)} = \frac{\eta_t}{\eta_i} \quad (7)$$

Next, a change in polarization state in a case where a subject is imaged through an imaging lens (hereinafter referred to as a "lens") will be described with reference to FIG. 2. As illustrated in FIG. 2, light in a polarization state S1 in a certain direction from a subject RLa is incident on a position B1 of a lens 21 from the air, and is refracted and changed to a polarization state S1". Further, the light in the polarization state S1" passes through the lens 21, exits from a position B2 into the air and is refracted and changed to a polarization state S1', and is observed by an image sensor 22 of a polarization imaging unit 20. In this case, the polarization state undergoes a change expressed in equation (8) and a change expressed in equation (9). Note that a matrix $M_{B1}$ in equation (8) is a Mueller matrix of the refraction produced at the position B1 of the lens, and a matrix $M_{B2}$ in equation (9) is a Mueller matrix of the refraction produced at the position B2 of the lens.

[Math. 6]

$$S_1'' = M_{B_1} \cdot S_1 \quad (8)$$

$$S_1' = M_{B_2} \cdot S_1'' \quad (8)$$

Therefore, the polarization state of the light observed by the image sensor and the polarization state of the light from the subject have a relationship expressed in equation (10). Note that a matrix $M1 = MB_{B1} \cdot M_{B2}$ is a Mueller matrix representing the amount of change in polarization state due to the lens 21 on the optical path.

[Math. 7]

$$S_1' = M_{B_2} \cdot M_{B_1} \cdot S_1 = M_1 \cdot S_1 \quad (10)$$

Figure 3A:
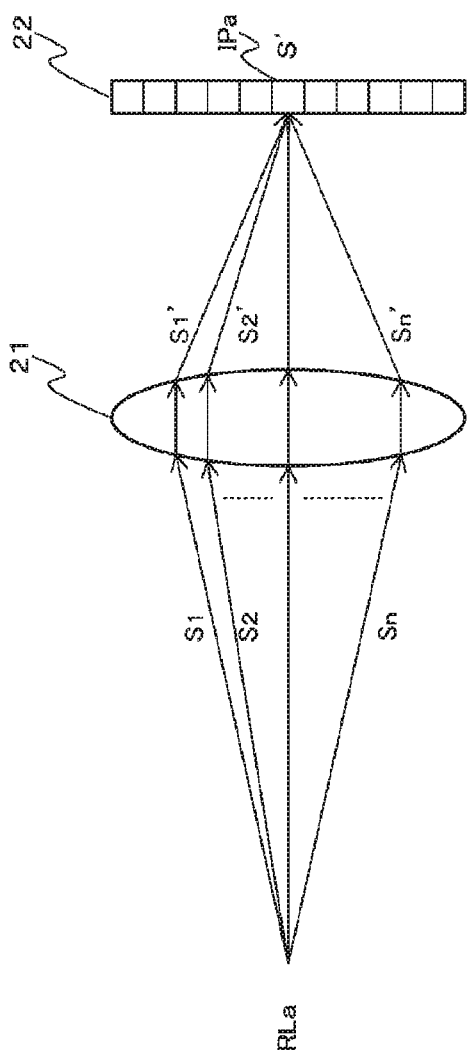
FIGS. 3A and 3B are diagrams illustrating light in a plurality of optical paths incident on a pixel of an image sensor.
Figure 3B:
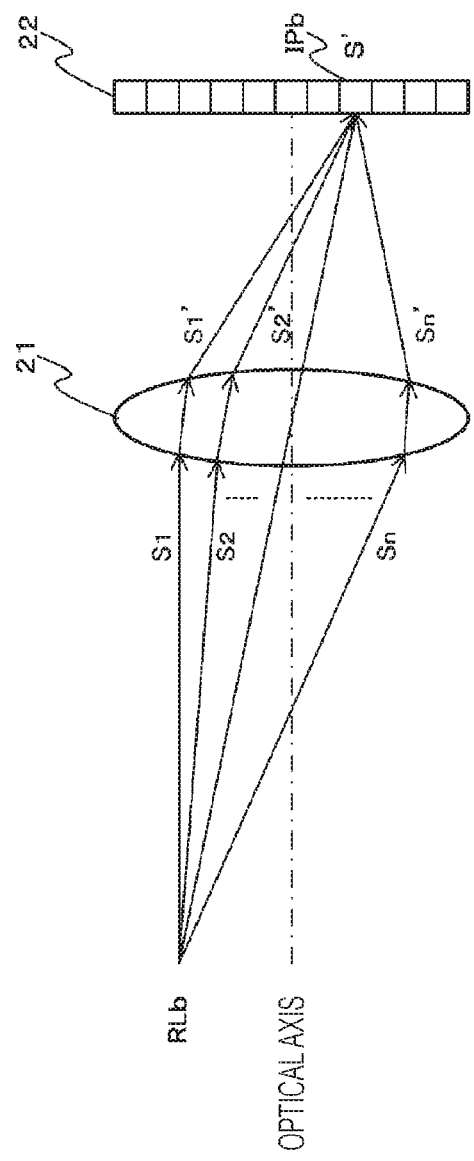

By the way, in the above description, a change in polarization state has been described on one optical path, but light in a plurality of optical paths is incident on a pixel of the image sensor. FIGS. 3A and 3B illustrate light in a plurality of optical paths incident on a pixel of the image sensor from a subject. Note that FIG. 3A illustrates light in a plurality of optical paths incident on a pixel IPa of the image sensor 22 from a subject RLa on the optical axis of the lens 21, and FIG. 3B illustrates light in a plurality of optical paths incident on a pixel IPb of the image sensor 22 from a subject RLb at a position distant from the optical axis of the lens 21. For example, in a case where light in polarization states S1 to Sn is incident on a pixel of the image sensor via the lens 21, the polarization state S' of the light incident on the pixel can be expressed by equation (11).

[Math. 8]

$$S' = S_1' + S_2' + \ldots + S_n' = M_1 \cdot S_1 + M_2 \cdot S_2 + \ldots + M_n \cdot S_n = \sum_{i=1}^{n} M_i \cdot S_i \quad (11)$$

Furthermore, assuming that a subject is some distance away from the lens 21, and the polarization state of light from the subject is equivalent to the polarization state $s_i$ of the light on each optical path passing through the lens 21, equation (11) becomes equation (12). Note that a matrix M in equation (12) is a Mueller matrix representing the amount of change in polarization state caused by the light from the subject passing through the lens 21, when observed at a pixel of the image sensor.

[Math. 9]

$$S' = \left( \sum_{i=1}^{n} M_i \right) \cdot S = M \cdot S \quad (12)$$

Thus, if the Mueller matrix M representing the amount of change in polarization state caused by passing through the lens 21 is known, the polarization state S of the light from the subject can be determined on the basis of equation (13), using the polarization state S' of the observed light and an inverse matrix $M^{-1}$ of the Mueller matrix M.

[Math. 10]

$$S = M^{-1} \cdot S' \quad (13)$$

Thus, the component values of the Mueller matrix M representing the amount of change in polarization state caused by passing through the lens 21, or the component values of the inverse matrix $M^{-1}$ of the Mueller matrix M representing the amount of change in polarization state caused by passing through the lens 21 (hereinafter referred to as "parameters") are estimated by a calibration apparatus described later and stored in an information processing apparatus in advance. Furthermore, the information processing apparatus determines the polarization state S of light from a subject from the stored parameters and the polarization state S' of observed light. Moreover, the information processing apparatus may perform normal calculation or reflection component adjustment processing on the basis of the determined polarization state S.

2. Configuration and Operation of Information Processing Apparatus

Figure 4:
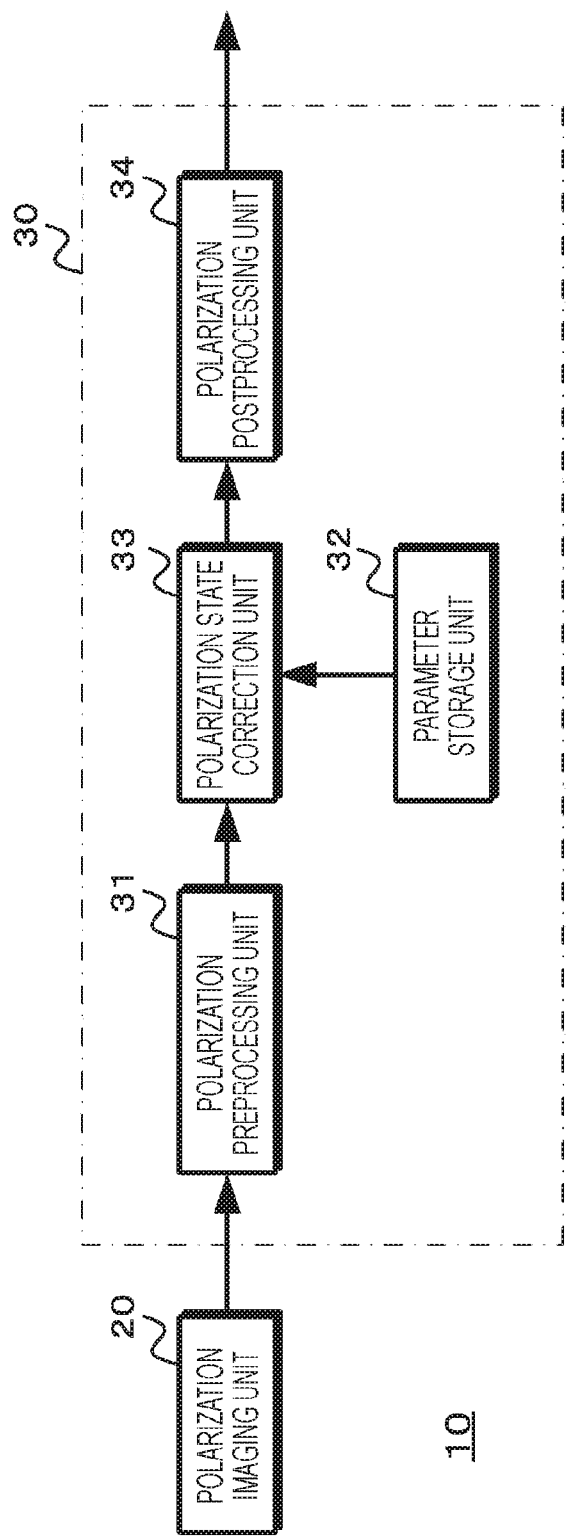
FIG. 4 is a diagram illustrating the configuration of an imaging system.

FIG. 4 illustrates the configuration of an imaging system using the information processing apparatus of the present technology. An imaging system 10 includes the polarization imaging unit 20 and an information processing unit 30. Further, the information processing unit 30 includes a polarization preprocessing unit 31, a parameter storage unit 32, a polarization state correction unit 33, and a polarization postprocessing unit 34. Note that the polarization preprocessing unit 31 may be provided in the polarization imaging unit 20, and the polarization postprocessing unit 34 may be provided separately from the information processing unit 30. Furthermore, the polarization imaging unit 20 and the information processing unit 30 are not limited to the case of being configured separately, and may be configured such that one of the polarization imaging unit 20 and the information processing unit 30 includes the other.

Figure 5:
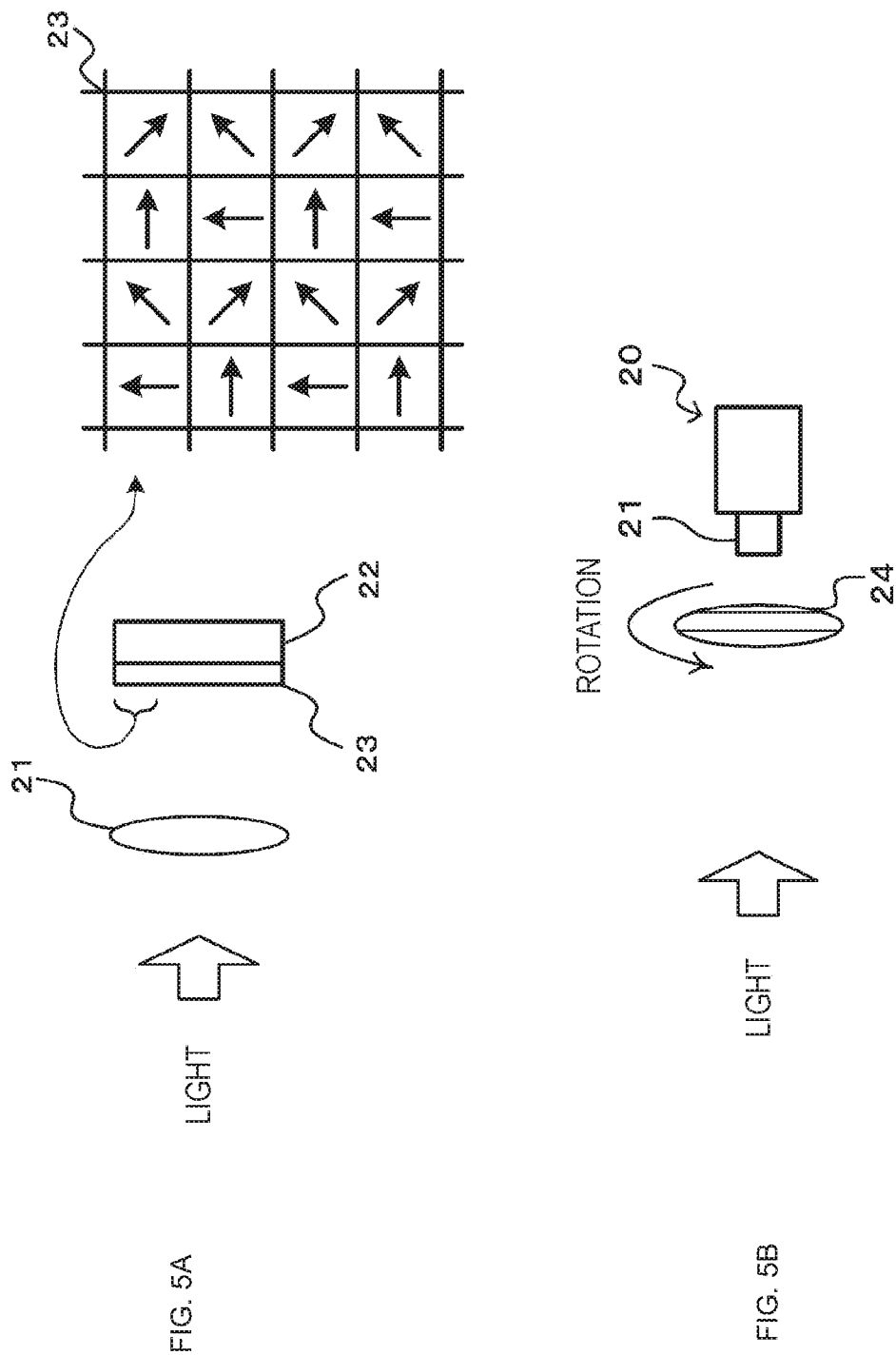
FIGS. 5A and 5B are diagrams illustrating a configuration in a case where a polarization imaging unit generates a polarization image.

The polarization imaging unit 20 acquires a plurality of polarization images with different polarization directions, for example, a polarization image containing at least three or more polarization components (the polarization directions may include non-polarization). FIGS. 5A and 5B illustrate a configuration in a case where the polarization imaging unit generates a polarization image. For example, as illustrated in FIG. 5A, the polarization imaging unit 20 has a polarizing filter 23 including pixels with a plurality of polarization directions disposed on the image sensor 22, and performs imaging through the lens 21 for generation. Note that FIG. 5A illustrates a case where the polarizing filter 23 in which each pixel is a pixel of one of four different types of polarization directions (the polarization directions are indicated by arrows) is disposed on the front surface of the image sensor 22. Furthermore, as illustrated in FIG. 5B, a polarizing plate 24 may be provided in front of the polarization imaging unit 20. In this case, the polarizing plate 24 is rotated to perform imaging in a plurality of different polarization directions to acquire a plurality of polarization images with the different polarization directions.

In a case where the image sensor 22 is not provided with a color filter, the polarization imaging unit 20 can acquire an intensity polarization image. Here, in the case of FIG. 5A, by averaging the intensities of four adjacent pixels with different polarization directions, an image equivalent to an unpolarized normal intensity image can be acquired. Furthermore, in the case of FIG. 5B, by averaging the intensities of intensity polarization images with different polarization directions on a pixel-by-pixel basis, an image equivalent to an unpolarized normal intensity image can be acquired.

Moreover, in addition to an intensity polarization image, the polarization imaging unit 20 may simultaneously generate a primary-color polarization image by providing the image sensor 22 with a color filter, or may simultaneously generate an infrared image or the like. Furthermore, the polarization imaging unit 20 may calculate intensities from a primary-color polarization image to generate an intensity polarization image.

The polarization preprocessing unit 31 of the information processing unit 30 performs processing such as pixel defect correction processing and demosaic processing. The pixel defect correction processing and the demosaic processing may be performed using a method disclosed in WO 2017/081925 A, for example. Furthermore, the polarization preprocessing unit 31 may perform pixel sensitivity correction processing. For sensitivity correction, for example, the polarization imaging unit 20 is irradiated with measurement light of uniform intensity and performs imaging, and variation correction information for correcting sensitivity variations due to differences in polarization direction produced in an acquired polarization image is generated in advance. Furthermore, using this variation correction information, sensitivity variations caused by differences in polarization direction are corrected. The polarization preprocessing unit 31 generates polarization state information on the basis of the processed polarization image. The polarization state information indicates a polarization state such as the intensity values of the different polarization directions, the Stokes vector, or the degree of polarization, the azimuth angle, and the average intensity on a pixel-by-pixel basis. The polarization preprocessing unit 31 outputs the generated polarization state information to the polarization state correction unit 33.

In the parameter storage unit 32, change parameters representing a change in polarization state due to the lens 21 or correction parameters for correcting a change in polarization state, which are generated by the calibration apparatus to be described later, are stored in advance. The parameter storage unit 32 outputs the stored pixel-by-pixel parameters to the polarization state correction unit 33.

The polarization state correction unit 33 corrects a change in polarization state due to the lens 21 produced in the pixel-by-pixel polarization state information provided from the polarization preprocessing unit 31, using the parameters stored in the parameter storage unit 32. The polarization state correction unit 33 outputs the corrected polarization state information to the polarization postprocessing unit 34.

The polarization postprocessing unit 34 performs generation of normal information and separation of reflection components and the like on the basis of the corrected polarization state information. The generation of normal information may be performed using, for example, a method disclosed in WO 2016/136086 A. Further, the decomposition of reflection components and the like may be performed using, for example, a method disclosed in WO 2016/136085 A.

Figure 6:
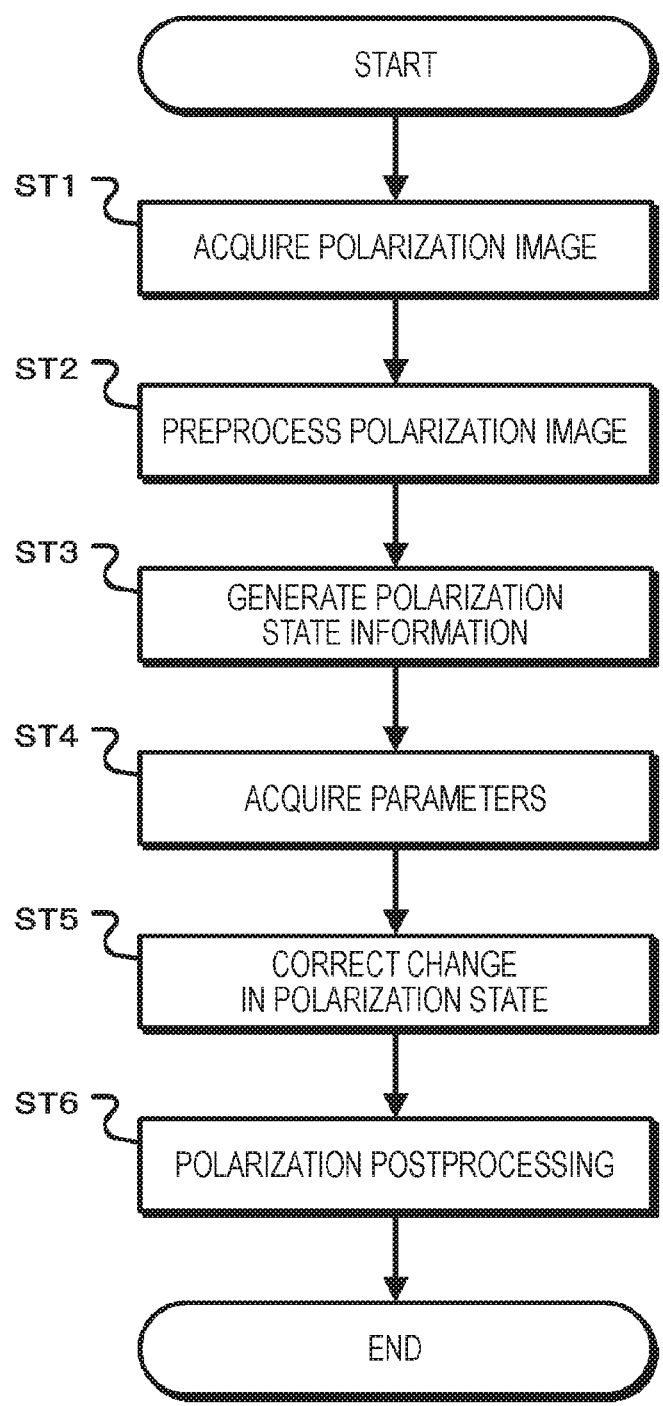
FIG. 6 is a flowchart illustrating the operation of an information processing unit.

Next, the operation of the information processing unit will be described. FIG. 6 is a flowchart illustrating the operation of the information processing unit.

In step ST1, the information processing unit acquires a polarization image. The information processing unit 30 acquires a polarization image acquired by imaging a subject with the polarization imaging unit 20, and proceeds to step ST2.

In step ST2, the information processing unit performs preprocessing of the polarization image. The polarization preprocessing unit 31 of the information processing unit 30 performs, as the preprocessing of the polarization image, for example, pixel defect correction processing, sensitivity correction processing, demosaic processing, and the like, and proceeds to step ST3.

In step ST3, the information processing unit generates polarization state information. The polarization preprocessing unit 31 or the polarization state correction unit 33 of the information processing unit 30 generates polarization state information of each pixel on the basis of the preprocessed polarization image. The polarization state information is information such as the intensity values of the different polarization directions, the Stokes vector, or the degree of polarization, the azimuth angle, and the average intensity. The information processing unit 30 generates the polarization state information and proceeds to step ST4.

In step ST4, the information processing unit acquires parameters. The polarization state correction unit 33 of the information processing unit 30 acquires, from the parameter storage unit 32, parameters corresponding to a pixel position to be corrected, for example, state change parameters representing a change in polarization state produced at the pixel position to be corrected, or correction parameters for correcting a change in polarization state produced at the pixel position to be corrected, and proceeds to step ST5.

In step ST5, the information processing unit corrects the change in polarization state. The polarization state correction unit 33 of the information processing unit 30 corrects the change of the polarization state in the polarization state information using the parameters acquired from the parameter storage unit 32, and proceeds to step ST6.

In step ST6, the information processing unit performs polarization postprocessing. The polarization postprocessing unit 34 of the information processing unit 30 performs the polarization postprocessing such as normal calculation processing, reflection removal processing, or the like on the basis of the polarization state information corrected for the change in polarization state.

The information processing unit 30 performs the processing in steps ST3 to ST6 on all pixels in the polarization image or all pixels in an area specified in advance. Furthermore, the information processing unit 30 performs the processing in steps ST1 to ST6 on a frame-by-frame basis.

Next, correction processing on a change in polarization state due to the lens will be described. In a case where the parameters acquired from the parameter storage unit 32 are change parameters representing a change in polarization state, the polarization state correction unit 33 calculates the inverse matrix of the change parameters to use them as correction parameters. The polarization state correction unit 33 performs polarization state change correction processing using the correction parameters.

In a case where the polarization state information is the Stokes vector of each pixel, the polarization state correction unit 33 performs the polarization state change correction processing on the Stokes vector. Furthermore, in a case where the polarization state information is the intensity values of the different polarization directions of each pixel, the polarization state change correction processing may be performed on the intensity values of the different polarization directions. Moreover, in a case where the polarization state information is represented by the degree of polarization, the azimuth angle, and the average intensity of each pixel, the correction may be performed on the degree of polarization, the azimuth angle, and the average intensity of each pixel. In a case where the polarization state information is the intensity values of the different polarization directions, or the degree of polarization, the azimuth angle, and the average intensity, only linearly polarized light is taken into account without including circularly polarized light.

1) In a case where the polarization state information is the Stokes vector of each pixel The polarization state correction unit performs the calculation in equation (13) described above to calculate the Stokes vector corrected for a change in polarization state due to the lens 21.

2) In a case where the polarization state information is the pixel values of the different polarization directions of each pixel In the polarization state correction unit, for example, the relationship between the pixel values $I_0$, $I_{45}$, $I_{90}$, and $I_{135}$ of the four polarization directions (0°, 45°, 90°, and 135°) and the Stokes vector $[s_0\ s_1\ s_2\ s_3]^T$ can be expressed by equation (14). Note that since only linearly polarized light is taken into account without including circularly polarized light, the component $s_3=0$, and the component $s_3$ is not included in equation (14).

[Math. 11]

$$\begin{bmatrix} s_0 \\ s_1 \\ s_2 \end{bmatrix} = \begin{bmatrix} \frac{I_0 + I_{45} + I_{90} + I_{135}}{2} \\ I_0 - I_{90} \\ I_{45} - I_{135} \end{bmatrix} = \begin{bmatrix} 0.5 & 0.5 & 0.5 & 0.5 \\ 1 & 0 & -1 & 0 \\ 0 & 1 & 0 & -1 \end{bmatrix} \begin{bmatrix} I_0 \\ I_{45} \\ I_{90} \\ I_{135} \end{bmatrix} \quad (14)$$

Furthermore, the pixel values of a polarization pixel have a periodicity of 180 degrees with respect to the polarization directions, and have the relationship "$I_0+I_{90}=I_{45}+I_{135}$". Considering this relationship, equation (14) becomes equation (15). Thus, equation (13) becomes equation (16) by using equation (15). On the basis of equation (17) into which equation (16) is transformed, a pixel value corrected for a change in polarization state due to the lens 21 can be obtained for each polarization direction.

[Math. 12]

$$\begin{bmatrix} s_0 \\ s_1 \\ s_2 \\ 0 \end{bmatrix} = \begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix} \begin{bmatrix} I_0 \\ I_{45} \\ I_{90} \\ I_{135} \end{bmatrix} \quad (15)$$

$$\begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix} \begin{bmatrix} I_0 \\ I_{45} \\ I_{90} \\ I_{135} \end{bmatrix} = M^{-1} \begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix} \begin{bmatrix} I'_0 \\ I'_{45} \\ I'_{90} \\ I'_{135} \end{bmatrix} \quad (16)$$

$$\begin{bmatrix} I_0 \\ I_{45} \\ I_{90} \\ I_{135} \end{bmatrix} = \begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix}^{-1} M^{-1} \begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix} \begin{bmatrix} I'_0 \\ I'_{45} \\ I'_{90} \\ I'_{135} \end{bmatrix} \quad (17)$$

3) In a case where the polarization state information is the degree of polarization, the azimuth angle, and the average intensity of each pixel, the relationship between the degree of polarization p, the azimuth angle φ, and the average intensity $s_0$, and the Stokes vector $[s_0\ s_1\ s_2\ s_3]^T$ can be expressed by equation (18) on the basis of equations (2) and (3) described above.

[Math. 13]

$$\begin{bmatrix} s_0 \\ s_1 \\ s_2 \\ 0 \end{bmatrix} = \begin{bmatrix} 2I \\ pI\sin\phi \\ pI\cos\phi \\ 0 \end{bmatrix} \quad (18)$$

Furthermore, the relationship between the degree of polarization p, the azimuth angle φ, and the average intensity $s_0$ of light from a subject, and the degree of polarization p', the azimuth angle φ', and the average intensity $s_0'$ of the light changed in polarization state by the lens 21 can be expressed by equation (19) on the basis of equations (13) and (18).

[Math. 14]

$$\begin{bmatrix} 2I \\ pI\sin\phi \\ pI\cos\phi \\ 0 \end{bmatrix} = M^{-1} \begin{bmatrix} 2I' \\ p'I'\sin\phi' \\ p'I'\cos\phi' \\ 0 \end{bmatrix} \quad (19)$$

Here, if the components of the inverse matrix $M^{-1}$ are expressed as in equation (20), the degree of polarization p of the light from the subject can be calculated on the basis of equation (21). Furthermore, the azimuth angle φ of the light from the subject can be calculated on the basis of equation (22), and the average intensity $s_0$ on the basis of equation (23).

[Math. 15]

$$M^{-1} = \begin{bmatrix} \widetilde{m_{00}} & \widetilde{m_{01}} & \widetilde{m_{02}} & \widetilde{m_{03}} \\ \widetilde{m_{10}} & \widetilde{m_{11}} & \widetilde{m_{12}} & \widetilde{m_{13}} \\ \widetilde{m_{20}} & \widetilde{m_{21}} & \widetilde{m_{22}} & \widetilde{m_{23}} \\ \widetilde{m_{30}} & \widetilde{m_{31}} & \widetilde{m_{32}} & \widetilde{m_{33}} \end{bmatrix}$$

$$p = \frac{\sqrt{(\widetilde{m_{10}}2I' + \widetilde{m_{11}}p'2I'\sin\phi' + \widetilde{m_{12}}p'2I'\cos\phi')^2 + (\widetilde{m_{20}}2I' + \widetilde{m_{21}}p'2I'\sin\phi' + \widetilde{m_{22}}p'2I'\cos\phi')^2}}{(s_0)} \quad (21)$$

$$\phi = \arctan\left(\frac{\widetilde{m_{10}}2I' + \widetilde{m_{11}}p'2I'\sin\phi' + \widetilde{m_{12}}p'2I'\cos\phi'}{\widetilde{m_{20}}2I' + \widetilde{m_{21}}p'2I'\sin\phi' + \widetilde{m_{22}}p'2I'\cos\phi'}\right) \quad (22)$$

$$2I = \widetilde{m_{00}}2I' + \widetilde{m_{01}}p'2I'\sin\phi' + \widetilde{m_{02}}p'2I'\cos \quad (23)$$

In this way, the information processing unit corrects the change in polarization state due to the lens produced in the polarization state information. Consequently, performing the polarization postprocessing using the corrected polarization state information allows normal calculation processing, reflection component removal processing, and the like to be performed with high accuracy, as compared with the case of using the polarization state information not corrected for the change in polarization state due to the lens.

3. Configuration and Operation of Calibration Apparatus

Figure 7:
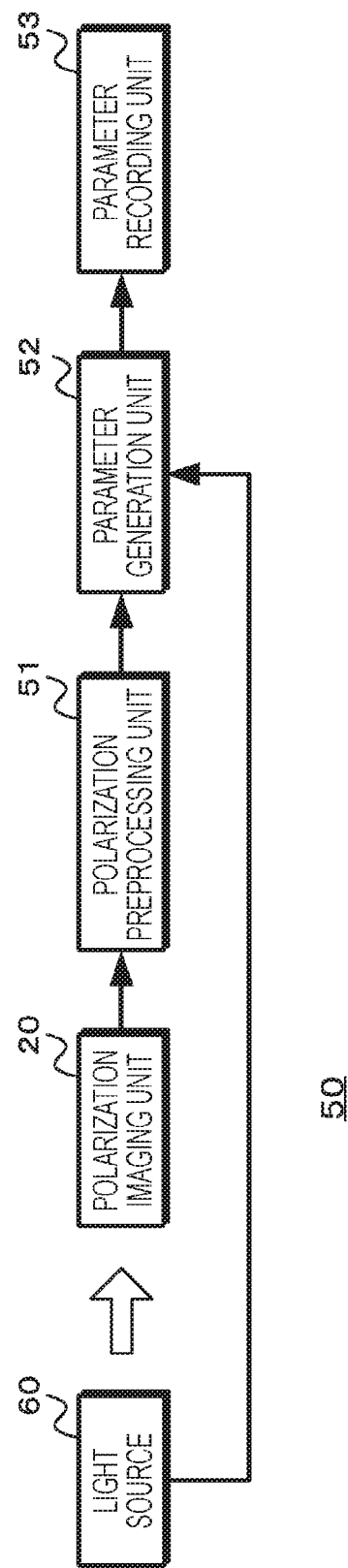
FIG. 7 is a diagram illustrating the configuration of a calibration apparatus.

Next, the calibration apparatus that estimates change parameters representing a change in polarization state due to the lens will be described. FIG. 7 illustrates the configuration of the calibration apparatus. A calibration apparatus 50 includes a polarization preprocessing unit 51, a parameter generation unit 52, a parameter recording unit 53, and a light source 60 that emits light from a planar light-emitting surface. Furthermore, it is configured such that a polarization image obtained by imaging the light source 60 by the above-described polarization imaging unit 20 is output to the polarization preprocessing unit 51.

The polarization preprocessing unit 51 is configured similarly to the polarization preprocessing unit 31 of the information processing unit 30, and performs pixel defect correction processing, sensitivity correction processing, demosaic processing, and the like on the polarization image acquired by the polarization imaging unit 20. Furthermore, using the preprocessed polarization image, the polarization preprocessing unit 51 or the parameter generation unit 52 generates polarization state information regarding each pixel, for example, polarization state information indicating a polarization state such as the intensity value of each of the different polarization directions, the Stokes vector, or the degree of polarization, the azimuth angle, and the average intensity.

The parameter generation unit 52 estimates a change in polarization state due to the lens 21 of the polarization imaging unit 20 on the basis of polarization state information indicating the polarization state of light output from the light source 60, and the polarization state information generated on the basis of the polarization image acquired by the polarization imaging unit 20 and subjected to the polarization preprocessing, and generates parameters. For example, the parameter generation unit 52 generates change parameters representing the change in polarization state due to the lens 21, or correction parameters for correcting the change in polarization state due to the lens 21, and records the generated parameters in the parameter recording unit 53.

The parameter recording unit 53 stores the parameters generated by the parameter generation unit 52. Furthermore, the parameters recorded in the parameter recording unit 53 are stored in advance in the parameter storage unit 32 of the information processing unit 30, and used to correct a change in polarization state due to the lens 21 produced in polarization state information as described above.

The light source 60 emits light from the planar light-emitting surface, and is configured to be able to switch the polarization state of emitted light. Furthermore, the light source 60 outputs light source polarization information indicating the polarization direction of emitted light and the like to the parameter generation unit 52.

Figure 8:
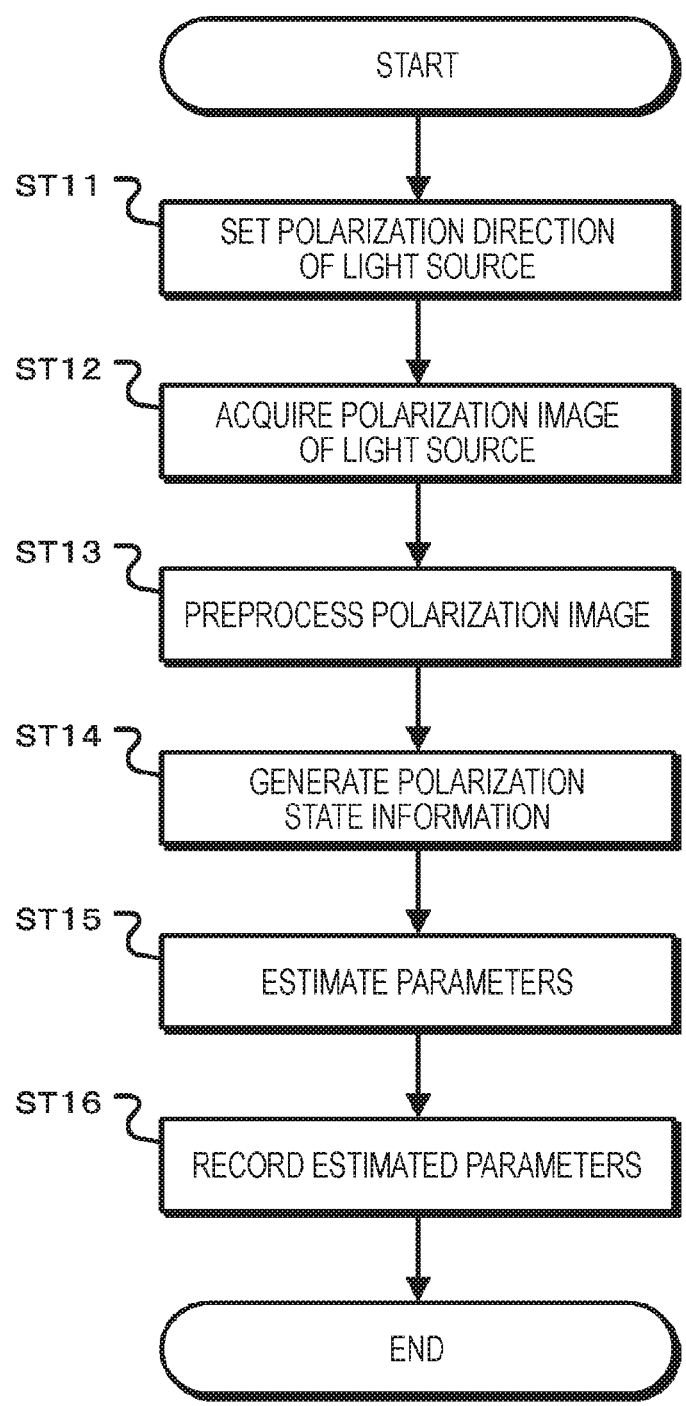
FIG. 8 is a flowchart illustrating the operation of the calibration apparatus.

Next, the operation of the calibration apparatus will be described. FIG. 8 is a flowchart illustrating the operation of the calibration apparatus.

In step ST11, the calibration apparatus sets the polarization direction of the light source. The light source 60 of the calibration apparatus 50 sets the polarization state of emitted light to a predetermined polarization direction, for example, 45° or 135°, generates polarization state information corresponding to the set polarization direction and outputs it to the parameter generation unit 52, and proceeds to step ST12.

In step ST12, the calibration apparatus acquires a polarization image of the light source. The polarization imaging unit 20 images the light source 60, acquires a polarization image with a plurality of polarization directions, and proceeds to step ST13. For example, in a case where the polarization imaging unit 20 has the configuration illustrated in_(a) of FIG. 5A, a polarization image having components with a plurality of polarization directions can be acquired by one-time imaging. Furthermore, in the case of the configuration illustrated in FIG. 5B, the polarizing plate 24 is rotated to perform imaging a plurality of times to acquire a polarization image for each polarization direction. The polarization imaging unit 20 acquires the polarization image with the plurality of polarization directions and proceeds to step ST13.

In step ST13, the calibration apparatus performs preprocessing of the polarization image. The polarization preprocessing unit 51 of the calibration apparatus 50 performs, as the preprocessing of the polarization image, for example, pixel defect correction processing, sensitivity correction processing, demosaic processing, and the like, and proceeds to step ST14.

In step ST14, the calibration apparatus generates polarization state information. The polarization preprocessing unit 51 or the parameter generation unit 52 of the calibration apparatus 50 generates polarization state information regarding each pixel on the basis of the preprocessed polarization image. The polarization state information is information such as the intensity values of the different polarization directions, the Stokes vector, or the degree of polarization, the azimuth angle, and the average intensity. The calibration apparatus 50 generates the polarization state information and proceeds to step ST15.

In step ST15, the calibration apparatus estimates parameters. The parameter generation unit 52 of the calibration apparatus 50 estimates parameters related to the polarization state due to the lens 21, on the basis of the polarization state information generated in step ST14 and the polarization state information provided from the light source 60. For example, the parameter generation unit 52 estimates, as the parameters, change parameters representing the change in polarization state or correction parameters for correcting the change in polarization state due to the lens 21, and proceeds to step ST16.

In step ST16, the calibration apparatus records the estimated parameters. The parameter generation unit 52 of the calibration apparatus 50 records the parameters estimated in step ST15 in the parameter recording unit 53. Furthermore, the parameter recording unit 53 stores the recorded parameters in the parameter storage unit 32 of the information processing unit 30.

Next, the operation of the parameter generation unit 52 will be described. The polarization direction of the light source 60 is an angle in a certain global coordinate system (X, Y, Z). The global coordinate system may be defined as desired. For example, a coordinate system is used in which a certain direction is set as a 0° direction, and the angle increases positively clockwise.

Figure 9:
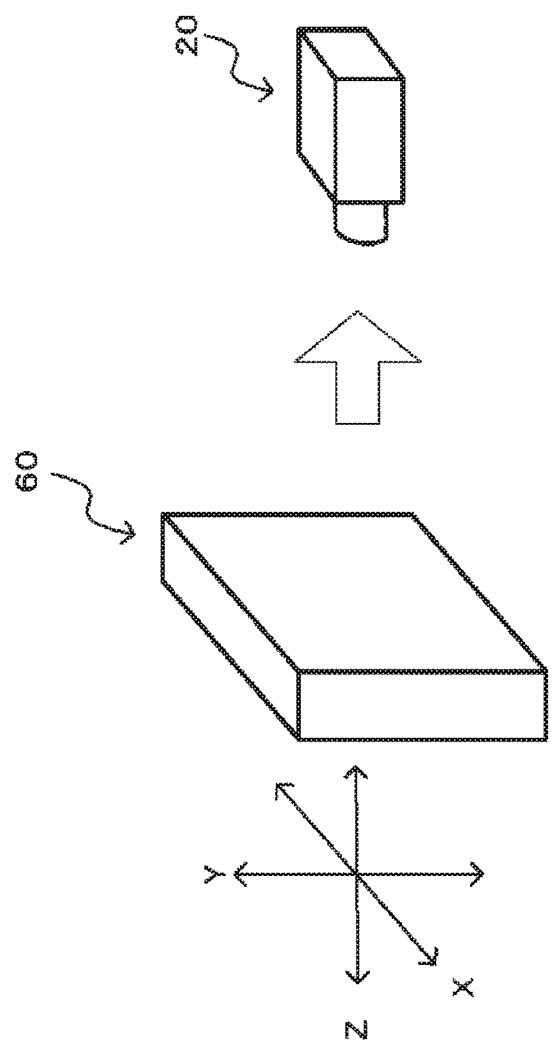
FIG. 9 is a diagram illustrating an arrangement of a light source and the polarization imaging unit.

FIG. 9 illustrates the arrangement of the light source and the polarization imaging unit. For the light source 60, for example, an X-axis direction is a polarization direction of 0° and a Y-axis direction is a polarization direction of 90°. Further, a direction perpendicular to the light-emitting surface of the light source 60 is a Z-axis direction. Furthermore, when the optical-axis direction of the polarization imaging unit 20 is set as the Z-axis direction, and the horizontal direction of the polarization imaging unit 20 as the X-axis direction, the X-axis direction is a polarization direction of 0° and the Y-axis direction is a polarization direction of 90°.

Here, in a case where the polarization imaging unit 20 is inclined in a rotation direction about the optical axis, an angular difference arises between, for example, a 0° polarization direction of the polarization imaging unit 20 and a 0° polarization direction of the light source 60. In such a case, the light source 60 is imaged by the polarization imaging unit 20 with the polarization direction of the light source 60 set, for example, to 0°, and the inclination of the polarization imaging unit 20 in the rotation direction is adjusted so that the intensity value of a 0° polarization direction in the polarization imaging unit 20 becomes the largest. Furthermore, cosine fitting may be performed using the intensity value of each polarization direction observed by the polarization imaging unit 20, to estimate intensity values corresponding to polarization directions of 0°, 45°, 90°, and 135° of the light source 60 from an obtained waveform, thereby to perform, for example, calculation of the Stokes vector on the basis of equation (1) using the estimated intensity values.

The parameter generation unit 52 estimates the values of the Mueller matrix corresponding to each pixel. Here, the Mueller matrix is a 3×3 matrix because in a normal environment, light from a subject includes almost no circularly polarized light, and thus the components $s_3'$ and $s_3$ in equation (4) are 0 as described above. Therefore, in order to estimate the nine components of the 3×3 Mueller matrix, only three or more pairs of the polarization state S of light from a subject and the polarization state S' of light observed is required. The light source 60 is imaged by the polarization imaging unit 20, switching light output from the light source 60 so that three or more pairs of the polarization state S of light from a subject and the polarization state S' of light observed are obtained.

Figure 10B:
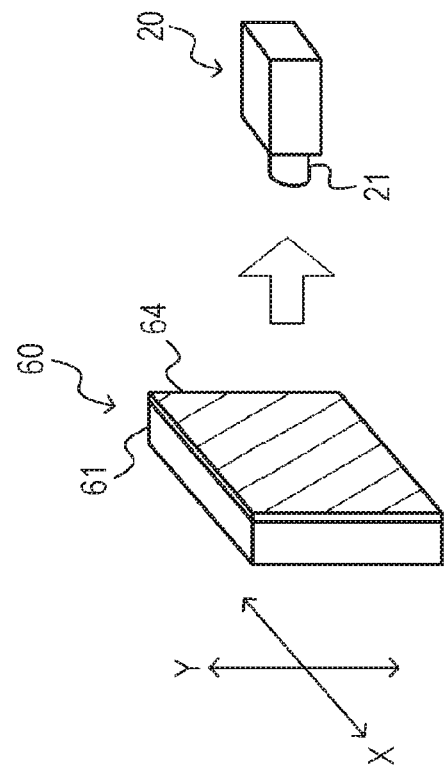
FIGS. 10A and 10B are diagrams illustrating the configuration of the light source.
Figure 10A:
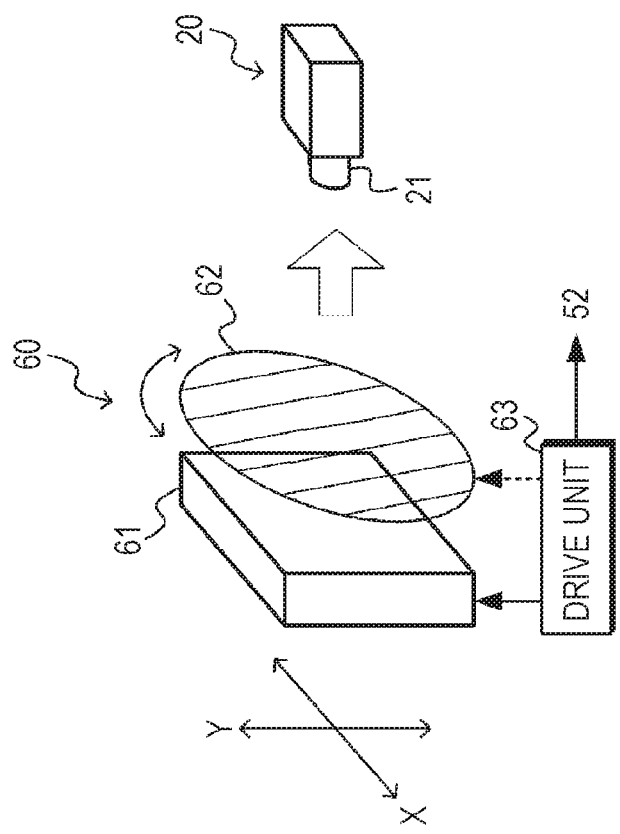

FIGS. 10A and 10B illustrate the configuration of the light source. As illustrated in FIG. 10A, for example, the light source 60 is configured using a surface light source 61, a polarizing plate 62, and a drive unit 63. The surface light source 61 has a light-emitting surface in a planar shape and emits unpolarized light. The polarizing plate 62 is provided at the light-emitting surface of the surface light source 61, and can be changed in polarization direction by the drive unit 63. The drive unit 63 changes the polarization direction of the polarizing plate 62. Furthermore, the drive unit 63 outputs light source polarization information indicating the polarization direction to the parameter generation unit 52.

The parameter generation unit 52 estimates the polarization state S' of each pixel on the basis of a polarization image acquired by the polarization imaging unit 20. Further, on the basis of the estimated polarization state S' of each pixel and the polarization state S of light emitted from the light source 60, one equation in equation (12) is formed. Furthermore, by repeating the processing to estimate the polarization state S' of each pixel on the basis of a polarization image acquired by causing the polarization imaging unit 20 to image the light source 60, changing the polarization direction and the amount of light emitted from the light source 60, the other equations in equation (12) are formed. Moreover, the parameter generation unit 52 calculates the components of the Mueller matrix M from the three or more equations formed, and records them in the parameter recording unit 53 as change parameters representing a change in polarization state. Note that the polarization state of light from a subject is estimated using equation (13), equation (17), or equation (19). Thus, in the parameter recording unit 53, the components of the inverse matrix $M^{-1}$ calculated from the Mueller matrix M may be recorded as correction parameters.

Further, in a case where a change in polarization state when a subject is imaged through the lens 21 is caused by refraction as described above, the relationship between the polarization state $s_i$ of incident light and the polarization state St of refracted light is given by equation (6). Furthermore, the Mueller matrix $M_t$ at this time can be expressed as equation (24). Note that a component a in equation (24) is a value calculated by equation (25), a component b by equation (26), and a component c by equation (27).

[Math. 16]

$$M_t = \begin{bmatrix} a & b & 0 & 0 \\ b & a & 0 & 0 \\ 0 & 0 & c & 0 \\ 0 & 0 & 0 & c \end{bmatrix} \quad (24)$$

-continued $$a = \frac{1}{2} \frac{\sin 2\theta_i \sin 2\theta_t}{(\sin\alpha_+ \cos\alpha_-)^2} \cdot (\cos^2\alpha_- + 1) \quad (25)$$

$$b = \frac{1}{2} \frac{\sin 2\theta_i \sin 2\theta_t}{(\sin\alpha_+ \cos\alpha_-)^2} \cdot (\cos^2\alpha_- - 1) \quad (26)$$

$$c = \frac{1}{2} \frac{\sin 2\theta_i \sin 2\theta_t}{(\sin\alpha_+ \cos\alpha_-)^2} \cdot (-2\cos\alpha_-) \quad (27)$$

Thus, the Mueller matrix $M_t$ of refraction has three components (a, b, c). Further, due to the symmetry of the matrix, the product or sum of a Mueller matrix of refraction and a Mueller matrix of refraction is a matrix having the same form. That is, the Mueller matrices M in equations (12) and (13) are also matrices having a form similar to that in equation (24). Here, the Mueller matrix M is expressed by equation (28), and the polarization direction of the light source 60 is set to 45°, for example. In this case, since the Stokes vector representing the polarization state S of light from the light source 60 is $[I_{45}\ 0\ I_{45}\ 0]^T$, and thus the components of the Stokes vector representing the polarization state S' of observed light $[s_0'\ s_1'\ s_2'\ s_3']^T$ are values calculated on the basis of equation (29). Furthermore, the components (a', b', c') of the Mueller matrix M are values expressed in equation (30). That is, the Mueller matrix M can be estimated by imaging once with the polarization imaging unit 20 with the polarization direction of light emitted from the light source 60 set, for example, to 45°, so that a change in polarization state due to the lens 21 can be calibrated. Furthermore, if the polarization direction of the light source 60 is set, for example, to 135°, the Stokes vector representing the polarization state S of light from the light source 60 is $[I_{135}\ 0\ -I_{135}\ 0]^T$, and thus the components (a', b', c') of the Mueller matrix M have values expressed in equation (31).

[Math. 17]

$$M = \begin{bmatrix} a' & b' & 0 & 0 \\ b' & a' & 0 & 0 \\ 0 & 0 & c' & 0 \\ 0 & 0 & 0 & c' \end{bmatrix} \quad (28)$$

$$S' = \begin{bmatrix} s_0' \\ s_1' \\ s_2' \\ s_3' \end{bmatrix} = \begin{bmatrix} a' & b' & 0 & 0 \\ b' & a' & 0 & 0 \\ 0 & 0 & c' & 0 \\ 0 & 0 & 0 & c' \end{bmatrix} \cdot \begin{bmatrix} I_{45} \\ 0 \\ I_{45} \\ 0 \end{bmatrix} \quad (29)$$

$$\begin{cases} a' = \dfrac{s_0'}{I_{45}} \\ b' = \dfrac{s_1'}{I_{45}} \\ c' = \dfrac{s_2'}{I_{45}} \end{cases} \quad (30)$$

$$\begin{cases} a' = \dfrac{s_0'}{I_{135}} \\ b' = \dfrac{s_1'}{I_{135}} \\ c' = -\dfrac{s_2'}{I_{135}} \end{cases} \quad (31)$$

In this way, by making the polarization direction of light emitted from the light source 60 equal to one of the plurality of polarization directions in a polarization image acquired by the polarization imaging unit 20 except the X-Y linear polarization directions (a polarization direction of 0° and a polarization direction of 90°), the components of the Mueller matrix M or the inverse matrix of the Mueller matrix M can be recorded as parameters in the parameter recording unit 53 by one-time imaging. Furthermore, since the parameters can be recorded in the parameter recording unit 53 by one-time imaging, the light source 60 can have a simple configuration. That is, for the polarization direction of emitted light, the light source 60 is only required to output light with a polarization direction equal to one of the plurality of polarization directions in a polarization image acquired by the polarization imaging unit 20 except the X-Y linear polarization directions. In this case, as illustrated in FIG. 10B, the light source 60 is configured using a surface light source 61 and, for example, a liquid crystal element 64. The surface light source 61 emits unpolarized light. The liquid crystal element 64 is provided on the light-emitting surface of the surface light source 61, and causes unpolarized light emitted from the surface light source 61 to have a polarization direction equal to one of the plurality of polarization directions in a polarization image acquired by the polarization imaging unit 20 except the X-Y linear polarization directions. In this case, if the polarization imaging unit 20 is opposed to the light source 60 and images the light source 60, parameters can be recorded in the parameter recording unit 53 by one-time imaging. Note that in FIG. 10B, a polarizing plate may be used instead of the liquid crystal element 64.

Next, an implementation example of calibration of the Mueller matrix M will be described. In a case where the polarization state is represented by the Stokes vector, the parameter generation unit 52 of the calibration apparatus 50 calibrates the Mueller matrix $M_t$ in equation (24).

In a case where the light source 60 is imaged by the polarization imaging unit 20 with the polarization state of light emitted from the light source 60 set to a 45-degree linear polarization direction having an angular difference of 45° with respect to the X-Y linear polarization directions, for example, a polarization direction of 45° (the Stokes vector is $[I_{45}\ 0\ I_{45}\ 0]^T$), the parameter generation unit 52 calculates the Mueller matrix M using equations (29) and (30). Furthermore, in a case where the light source 60 is imaged by the polarization imaging unit 20 with the polarization state of light emitted from the light source 60 set to a polarization direction of 135° (the Stokes vector is $[I_{135}\ 0\ -I_{135}\ 0]^T$), the parameter generation unit 52 calculates the Mueller matrix M using equations (29) and (31).

Furthermore, not limited to the case where light emitted from the light source 60 has a direction equal to one of the plurality of polarization directions in a polarization image acquired by the polarization imaging unit 20 except the X-Y linear polarization directions, the Mueller matrix can also be calculated using linearly polarized light with any polarization direction, for example, θL, except the X-Y linear polarization directions. In a case where light emitted from the light source is linearly polarized light with a polarization direction θL, and an intensity I(θL), the respective intensities $I_0$, $I_{45}$, $I_{90}$, and $I_{135}$ of the polarization directions of 0°, 45°, 90°, and 135° have values based on equation (32). Furthermore, the Stokes vector of the light source can be calculated on the basis of equation (33) using the intensities $I_0$, $I_{45}$, $I_{90}$, and $I_{135}$.

[Math. 18]

$$\begin{bmatrix} I_0 \\ I_{45} \\ I_{90} \\ I_{135} \end{bmatrix} = \begin{bmatrix} I_{\theta_L}\cos^2(\theta_L - 0) \\ I_{\theta_L}\cos^2(\theta_L - 45) \\ I_{\theta_L}\cos^2(\theta_L - 90) \\ I_{\theta_L}\cos^2(\theta_L - 135) \end{bmatrix} \quad (32)$$

$$\begin{bmatrix} s_0 \\ s_1 \\ s_2 \end{bmatrix} = \begin{bmatrix} \dfrac{I_0 + I_{45} + I_{90} + I_{135}}{2} \\ I_0 - I_{90} \\ I_{45} - I_{135} \end{bmatrix} \quad (33)$$

The polarization state S' in a case where the light source with the Stokes vector $[s_0\ s_1\ s_2\ 0]^T$ calculated by equation (31) is imaged by the polarization imaging unit 20 is given by equation (34), and the components a, b, and c of the Mueller matrix M can be calculated on the basis of equation (35).

[Math. 19]

$$S' = \begin{bmatrix} s'_0 \\ s'_1 \\ s'_2 \\ s'_3 \end{bmatrix} = \begin{bmatrix} a' & b' & 0 & 0 \\ b' & a' & 0 & 0 \\ 0 & 0 & c' & 0 \\ 0 & 0 & 0 & c' \end{bmatrix} \cdot \begin{bmatrix} s_0 \\ s_1 \\ s_2 \\ 0 \end{bmatrix} \quad (34)$$

$$\begin{cases} a' = \dfrac{s'_0 s_0 - s'_1 s_1}{s_0^2 - s_1^2} \\ b' = \dfrac{s'_0 s_1 - s'_1 s_0}{s_0^2 - s_1^2} \\ c' = \dfrac{s'_2}{s_2} \end{cases} \quad (35)$$

That is, as is clear from equation (35), if "$s_2 \neq 0$" and "$s_0^2 \neq s_1^2$", the component values of the Mueller matrix M can be calculated. "$s_2 \neq 0$" is equivalent to "$I_{45} - I_{135} \neq 0$", and further light emitted from the light source 60 is equivalent to the polarization direction "θL≠0°" and "θL≠90°". Furthermore, "$s_0^2 \neq s_1^2$" is equivalent to "$I_0 \neq 0$" and "$I_{90} \neq 0$", and is further equivalent to "θL≠90°" and "θL≠0°". Therefore, the conditions "$s_2 \neq 0$" and "$s_0^2 \neq s_1^2$" are equivalent to "θL≠0°" and "θL≠90°".

Therefore, the calibration apparatus 50 sets the polarization direction of light emitted from the light source 60 to a desired angle that is not the X-Y linear polarization directions (0° and 90°), and the parameter generation unit 52 calculates the component values of the Mueller matrix M using the equations (32), (34), and (35) and records them in the parameter recording unit 53.

Next, calibration in a case where the polarization state is represented by the intensity values of polarization directions of 0°, 45°, 90° and 135° will be described.

In a first method of calibration, the Stokes vector S is calculated on the basis of equation (1) using the respective intensity values $I_0$, $I_{45}$, $I_{90}$, and $I_{135}$ of polarization directions of 0°, 45°, 90°, and 135°. Moreover, processing similar to that in the above-described case where the polarization state is represented by the Stokes vector is performed using the calculated Stokes vector S, and the component values of the Mueller matrix M are calculated and recorded in the parameter recording unit 53.

In a second method of calibration, the component values of the matrix X expressed in equation (36) are calculated and recorded in the parameter recording unit 53. Note that as expressed in equation (17), the matrix X is a matrix for correcting the intensity values representing a changed polarization state to the intensity values of the polarization state before the change. By substituting equation (24) into equation (36), equation (36) becomes equation (37).

[Math. 20]

$$X = \begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix}^{-1} M^{-1} \begin{bmatrix} 0.5 & 0.5 & 0.5 & 0.5 \\ 1 & 0 & -1 & 0 \\ 0 & 1 & 0 & -1 \\ 1 & -1 & 1 & -1 \end{bmatrix} \quad (36)$$

$$X = \begin{bmatrix} 0.75a + 0.75b + 0.25c & 0.25a + 0.25b - 0.25c & -0.25a - 0.25b + 0.25c & 0.25a + 0.25b - 0.25c \\ 0.25a + 0.5b - 0.25c & 0.25a + 0.75c & 0.25a - 0.5b - 0.25c & 0.25a - 0.25c \\ -0.25a + 0.25b + 0.25c & 0.25a - 0.25b - 0.25c & 0.75a - 0.75b + 0.25c & 0.25a - 0.25b - 0.25c \\ 0.25a + 0.5b - 0.25c & 0.25a - 0.25c & 0.25a - 0.5b - 0.25c & 0.25a + 0.75c \end{bmatrix} \quad (37)$$

The polarization state of light emitted from the light source 60 ($I_0$, $I_{45}$, $I_{90}$, and $I_{135}$) and the polarization state obtained by imaging the light source 60 with the polarization imaging unit 20 ($I_0'$, $I_{45}'$, $I_{90}'$, and $I_{135}'$) have the relationship in equation (38).

[Math. 21]

$$\begin{bmatrix} I_0 \\ I_{45} \\ I_{90} \\ I_{135} \end{bmatrix} = X \begin{bmatrix} I_0' \\ I_{45}' \\ I_{90}' \\ I_{135}' \end{bmatrix} \quad (38)$$

Thus, by using four or more equations representing the relationship between the polarization state of light emitted from the light source 60 and the polarization state obtained by imaging the light source 60 with the polarization imaging unit 20, changing the light emitted from the light source 60, the components a, b, and c of the matrix X can be calculated. Furthermore, by the calculation of equation (38) using the matrix X, a change in polarization state of light emitted from the light source 60 due to the lens 21 can be corrected. Note that if the polarization direction of light emitted from the light source 60 is 0° or 90°, the components a, b, and c of the matrix X cannot be determined. Thus, the polarization direction of light emitted from the light source 60 is set to a desired angle except 0° and 90°.

Furthermore, in a case where the polarization state is represented by the angle of polarization, the degree of polarization, and the average intensity, the Stokes vector S is calculated on the basis of equation (18) using the angle of polarization, the degree of polarization, and the average intensity. Moreover, by performing processing similar to that in the above-described case where the polarization state is represented by the Stokes vector, using the calculated Stokes vector S, the component values of the Mueller matrix M can be calculated and recorded in the parameter recording unit 53.

Note that in the above-described embodiment, the configuration in which the light source polarization information is output from the light source 60 to the parameter generation unit 52 has been illustrated, but a calibration control unit that controls a calibration operation may be provided to control each unit to record parameters in the parameter recording unit 53. In this case, the calibration control unit performs lighting control and polarization direction switching control of the light source 60, and imaging control of the polarization imaging unit 20, so as to obtain three or more equations representing the relationship between the polarization state S of light emitted from the light source 60 and the polarization state S' estimated from a polarization image acquired by the polarization imaging unit 20. By thus controlling the light source 60 and the polarization imaging unit 20, parameters can be automatically recorded in the parameter recording unit 53.

Furthermore, the information processing unit may be provided with a calibration function. FIG. 11 illustrates the configuration of an information processing unit having a calibration function. Note that in FIG. 11, the same reference numerals are assigned to parts corresponding to those in FIG. 4. The information processing unit 30 includes the polarization preprocessing unit 31, the parameter storage unit 32, the polarization state correction unit 33, the polarization postprocessing unit 34, and a parameter generation unit 35.

The polarization preprocessing unit 31 performs processing such as pixel defect correction processing and demosaic processing, and generates polarization state information on the basis of a processed polarization image and outputs it to the polarization state correction unit 33.

The parameter storage unit 32 stores parameters generated by the parameter generation unit 35. Furthermore, the parameter storage unit 32 outputs the stored parameters to the polarization state correction unit 33.

The polarization state correction unit 33 corrects a change in polarization state due to the lens 21 produced in pixel-by-pixel polarization state information provided from the polarization preprocessing unit 31, using parameters corresponding to the lens 21 from the parameters stored in the parameter storage unit 32. The polarization state correction unit 33 outputs the corrected polarization state information to the polarization postprocessing unit 34. On the basis of the corrected polarization state information, the polarization postprocessing unit 34 performs generation of normal information and separation of reflection components and the like.

The parameter generation unit 35 is configured similarly to the parameter generation unit 52 of the calibration apparatus 50. The parameter generation unit 35 generates parameters on the basis of the polarization image processed by the polarization preprocessing unit 31 and the light source polarization information from the light source 60, and stores them in the parameter storage unit 32.

If the information processing unit is thus provided with the calibration function, only facilitating the light source 60 allows calibration for accurately correcting a change in polarization state caused by the lens 21 used in the polarization imaging unit 20.

Further, in a case where the lens 21 of the polarization imaging unit 20 can be changed, the calibration is performed for each lens used. Furthermore, in the parameter storage unit 32 of the information processing unit 30, parameters acquired by performing the calibration for each lens are stored in advance. On the basis of lens information acquired from the polarization imaging unit 20, the information processing unit 30 outputs parameters corresponding to the lens 21 used when a polarization image is acquired by the polarization imaging unit 20, from the parameter storage unit 32 to the polarization state correction unit 33. Alternatively, the parameter storage unit 32 may be provided at each lens, and parameters may be output from the parameter storage unit 32 of a lens used to the polarization state correction unit 33. If the polarization state information is corrected using parameters corresponding to a lens used in this manner, the calculation of normal information and the separation, removal, and the like of reflection components can be performed accurately even if a lens change is performed. Furthermore, in a case where the lens 21 is a zoom lens, parameters corresponding to zoom magnifications may be stored in advance in the parameter storage unit 32, and parameters corresponding to a zoom magnification when a polarization image is acquired may be output to the polarization state correction unit 33.

Furthermore, in the above-described embodiment, parameters calculated on a pixel-by-pixel basis are stored in the parameter storage unit 32, but in the calibration, parameters may be generated at predetermined pixel intervals, and the parameters at the predetermined pixel intervals may be stored in the parameter storage unit 32. In a case where parameters at predetermined pixel intervals are stored in the parameter storage unit 32, the polarization state correction unit 33 generates parameters for pixels for which parameters are not stored, using the parameters acquired from the parameter storage unit 32 and a preset function. This interpolation processing eliminates the need to store parameters for each pixel, and allows a reduction in memory capacity required in the parameter storage unit 32. Moreover, in interpolation processing, an approximate function representing the relationship between a pixel position and parameters may be determined on the basis of pixel-by-pixel parameters calculated by the calibration, and stored in the parameter storage unit 32. In this case, the polarization state correction unit 33 calculates parameters corresponding to the position of a pixel to be corrected on the basis of the approximate function acquired from the parameter storage unit 32.

4. Application Examples

The technology according to the present disclosure can be applied to various fields. For example, the technology according to the present disclosure may be implemented as an apparatus mounted on any type of mobile object such as an automobile, an electric vehicle, a hybrid electric vehicle, a motorcycle, a bicycle, personal mobility, an airplane, a drone, a ship, or a robot. Furthermore, it may be implemented as an apparatus mounted on equipment used in a production process in a factory or equipment used in the construction field. The application to such fields allows correction of a change in polarization state due to a lens produced in polarization state information, and thus allows generation of normal information and separation of reflection components and the like to be performed accurately on the basis of the corrected polarization state information. Consequently, a surrounding environment can be accurately grasped in three dimensions, and the fatigue of a driver or an operator can be reduced. Furthermore, automatic driving and the like can be performed more safely.

The technology according to the present disclosure can also be applied to the medical field. For example, if it is applied to the case of using a captured image of an operative site in an operation, an image of a three-dimensional shape of the operative site or without reflection can be obtained accurately, which allows a reduction in the fatigue of an operator and a safe and more reliable operation.

Furthermore, the technology according to the present disclosure can also be applied to fields such as public services. For example, to publish an image of a subject in a book, a magazine, or the like, unnecessary reflection components and the like can be removed accurately from the image of the subject.

A series of processing steps described in the description can be implemented by hardware, software, or a composite configuration of them. In a case where processing by software is implemented, a program in which a processing sequence is recorded is installed in memory in a computer built in dedicated hardware, to be executed. Alternatively, the program may be installed on a general-purpose computer capable of executing various types of processing, to be executed.

For example, the program can be recorded in advance in a hard disk, a solid-state drive (SSD), or a read-only memory (ROM) as a recording medium. Alternatively, the program may be stored (recorded) temporarily or permanently in a removable recording medium such as a flexible disk, a compact disc read-only memory (CD-ROM), a magneto optical (MO) disk, a digital versatile disc (DVD), a Blue-ray Disc (BD (registered trademark)), a magnetic disk, or a semiconductor memory card. Such a removable recording medium can be provided as so-called package software.

Furthermore, the program may be installed on a computer from a removable recording medium, or may be transferred by radio or wire from a download site to a computer via a network such as a local-area network (LAN) or the Internet. The computer can receive the program transferred in such a manner and install it on a recording medium such as a built-in hard disk.

Note that the effects described in the present description are merely illustrative and non-limiting, and there may be additional effects not described. Furthermore, the present technology should not be construed as being limited to the embodiment of the technology described above. The embodiment of this technology discloses the present technology in an illustrative form, and it is obvious that those skilled in the art can modify or substitute the embodiment without departing from the gist of the present technology. That is, in order to determine the gist of the present technology, the claims should be taken into consideration.

Furthermore, the information processing apparatus of the present technology can also have the following configurations.

(1) An information processing apparatus including a polarization state correction unit that corrects a change in polarization state due to a lens produced in polarization state information based on a polarization image acquired by imaging using the lens, using parameters related to the change in polarization state due to the lens estimated in advance from polarization state information acquired by imaging a light source in a predetermined polarization state using the lens and polarization state information indicating the polarization state of the light source.

(2) The information processing apparatus according to (1), in which the parameters are change parameters representing the change in polarization state or correction parameters for correcting the change in polarization state.

(3) The information processing apparatus according to (1) or (2), in which the polarization state information includes a Stokes vector obtained from pixel values with different polarization directions, and the parameters are component values of a matrix representing an amount of change of the polarization state information.

(4) The information processing apparatus according to (1) or (2), in which the polarization state information includes pixel values with different polarization directions, and the parameters are component values of a matrix calculated using a matrix representing a relationship between the pixel values with the different polarization directions, a matrix representing a relationship between the pixel values with the different polarization directions and a Stokes vector obtained from the pixel values with the different polarization directions, and a matrix representing an amount of change of the polarization state information when the polarization state information indicates the Stokes vector.

(5) The information processing apparatus according to (1) or (2), in which the polarization state information includes a degree of polarization, an azimuth angle, and an average intensity, and the parameters are component values of a matrix representing an amount of change of the polarization state information.

(6) The information processing apparatus according to any one of (1) to (5), in which the parameters are provided on a pixel-by-pixel basis.

(7) The information processing apparatus according to any one of (1) to (6), in which the polarization image contains at least three or more polarization components.

(8) The information processing apparatus according to any one of (1) to (7), further including a polarization preprocessing unit that performs defect correction or sensitivity correction of the polarization image acquired by imaging using the lens, in which the polarization state information is generated on the basis of the polarization image corrected by the polarization preprocessing unit.

(9) The information processing apparatus according to any one of (1) to (8), further including a polarization imaging unit that acquires the polarization image by imaging using the lens.

INDUSTRIAL APPLICABILITY

According to the information processing apparatus, the information processing method, and the program of this technology, even if polarization state information based on a polarization image acquired by imaging using a lens has a change in polarization state due to the lens, the change in polarization state can be corrected using parameters related to the change in polarization state due to the lens which are estimated in advance from polarization state information acquired by imaging a light source in a predetermined polarization state using the lens and polarization state information indicating the polarization state of the light source. Furthermore, according to the calibration apparatus of this technology, parameters related to a change in polarization state due to a lens can be generated. Consequently, generation of normal information and separation of reflection components and the like can be performed accurately on the basis of the polarization state information corrected for the change in polarization state due to the lens. Therefore, it is suitable for fields in which a surrounding environment is grasped in three dimensions, fields in which reflection components are adjusted, and the like.

REFERENCE SIGNS LIST

10 Imaging system
20 Polarization imaging unit
21 Lens
22 Image sensor
23 Polarizing filter
24, 62 Polarizing plate
30 Information processing unit
31, 51 Polarization preprocessing unit
32 Parameter storage unit
33 Polarization state correction unit
34 Polarization postprocessing unit
35, 52 Parameter generation unit
50 Calibration apparatus
53 Parameter recording unit
60 Light source
61 Surface light source
63 Drive unit
64 Liquid crystal element

The invention claimed is:

1. An information processing apparatus, comprising:
a memory configured to store a plurality of parameters; and
a processor configured to:
acquire, from an image sensor that images a light source using a lens, a polarization image;
generate polarization state information based on the polarization image, wherein the polarization state information indicates a polarization state of light from the light source; and
correct a change in the polarization state of the light in the polarization image, wherein
the change in the polarization state of the light is due to the lens,
the correction of the change in the polarization state is based on the stored plurality of parameters, and
the stored plurality of parameters is related to the change in the polarization state of the light due to the lens.

2. The information processing apparatus according to claim 1, wherein the plurality of parameters includes one of change parameters representing the change in the polarization state or correction parameters to correct the change in the polarization state.

3. The information processing apparatus according to claim 1, wherein the polarization state information includes a Stokes vector obtained from a plurality of pixel values with different polarization directions, and the plurality of parameters correspond to component values of a matrix representing an amount of change of the polarization state information.

4. The information processing apparatus according to claim 1, wherein the polarization state information includes a plurality of pixel values with different polarization directions, and the plurality of parameters correspond to component values of a matrix calculated using a matrix representing a relationship between the plurality of pixel values with the different polarization directions and a Stokes vector, the Stokes vector is obtained from the plurality of pixel values with the different polarization directions, and the matrix represents an amount of change of the polarization state information in a case where the polarization state information indicates the Stokes vector.

5. The information processing apparatus according to claim 1, wherein the polarization state information includes an azimuth angle, a degree of polarization, and an average intensity, and the plurality of parameters correspond to component values of a matrix representing an amount of change of the polarization state information.

6. The information processing apparatus according to claim 1, wherein the plurality of parameters are stored on a pixel-by-pixel basis of the polarization image.

7. The information processing apparatus according to claim 1, wherein the polarization image includes at least three or more polarization components.

8. The information processing apparatus according to claim 1, wherein the processor is further configured to:
perform one of defect correction or sensitivity correction of the polarization image; and
generate the polarization state information based on the polarization image that has been corrected.

9. The information processing apparatus according to claim 1, further comprising the image sensor configured to acquire the polarization image by imaging using the lens.

10. An information processing method, comprising:
storing, by a memory, a plurality of parameters;
acquiring, by a processor, a polarization image from an image sensor that images a light source using a lens;
generating, by the processor, polarization state information based on the polarization image, wherein the polarization state information indicates a polarization state of light from the light source; and
correcting, by the processor, a change in the polarization state of the light in the polarization image, wherein
the change in the polarization state of the light is due to the lens,
the correction of the change in the polarization state is based on the stored plurality of parameters, and
the stored plurality of parameters is related to the change in the polarization state of the light due to the lens.

11. A non-transitory computer-readable medium having stored thereon, computer-executable instructions that, when executed by a processor, cause the processor to execute operations, the operations comprising:
storing a plurality of parameters is stored in a memory;
acquiring, from an image sensor that images a light source using a lens, a polarization image;
generating polarization state information based on the polarization image, wherein the polarization state information indicates a polarization state of light from the light source; and
correcting a change in the polarization state of the light in the polarization image, wherein
the change in the polarization state of the light is due to the lens,
the correction of the change in the polarization state is based on the stored plurality of parameters, and
the stored plurality of parameters is related to the change in the polarization state of the light due to the lens.

* * * * *